United States Patent [19]

Nahar

[11] Patent Number: 5,065,842
[45] Date of Patent: Nov. 19, 1991

[54] REMOVABLE WINDOW CARRIER FOR MOUNTING IN A SCANNER CHECKOUT COUNTER

[75] Inventor: Rathindra Nahar, Cambridge, Ohio
[73] Assignee: NCR Corporation, Dayton, Ohio
[21] Appl. No.: 395,624
[22] Filed: Aug. 18, 1989
[51] Int. Cl.$^5$ .............................................. A47F 9/04
[52] U.S. Cl. ...................................... 186/61; 49/463; 49/466; 52/401
[58] Field of Search .................. 186/61, 59; 49/463, 49/466; 52/769, 401, 476

[56] References Cited

U.S. PATENT DOCUMENTS

| | | |
|---|---|---|
| 432,974 | 7/1890 | Carlton . |
| 1,017,196 | 2/1912 | Baloian .................................. 52/476 |
| 1,961,584 | 6/1934 | Hathorn . |
| 2,596,710 | 5/1952 | Moricco et al. .................. 49/463 X |
| 3,365,571 | 1/1968 | Koziol ............................. 49/463 X |
| 3,549,043 | 12/1970 | Walte . |
| 3,551,020 | 12/1970 | Cowan et al. . |
| 4,020,924 | 5/1977 | Conrotto et al. . |
| 4,138,000 | 2/1979 | Hartup .................................... 186/61 |
| 4,162,826 | 7/1979 | Van der Beck et al. . |
| 4,196,545 | 4/1980 | Korany et al. . |
| 4,206,537 | 6/1980 | Meginnis . |
| 4,372,652 | 2/1983 | Pontefract . |
| 4,656,344 | 4/1987 | Mergenthaler et al. . |
| 4,676,024 | 6/1987 | Rossman ,.......................... 49/466 X |
| 4,971,177 | 11/1990 | Nojiri et al. ........................... 186/61 |

OTHER PUBLICATIONS

Spectra-Physics Retail Systems, "Flat Top SL" brochure, 7-1989.
Spectra-Physics Retail Systems, "Freedom Scanner" brochure, R45-0211, 3-1989; R45-0211-01, 3-1989.

Primary Examiner—Robert J. Spar
Assistant Examiner—William M. Hienz
Attorney, Agent, or Firm—Matthew R. Jenkins

[57] ABSTRACT

A removable window carrier for removably mounting in the top surface of a scanner checkout counter, the removable window carrier comprising a frame member having an aperture therein, a window member which is removably secured in the aperture of the frame member so that the window member provides a transparent support through which scanning light beams are projected and over which items of merchandise bearing coded labels are passed. The removable window carrier makes it easy to handle the window member so as to facilitate removing or cleaning the window member.

4 Claims, 4 Drawing Sheets

REMOVABLE WINDOW CARRIER FOR MOUNTING IN A SCANNER CHECKOUT COUNTER

BACKGROUND OF THE INVENTION

1. Field of the Invention

This invention relates to an optical scanning system and more particularly to a removable window carrier for mounting in the top surface of a scanner checkout counter in the optical scanning system.

2. Description of the Related Art.

In present-day merchandising point-of-sale terminals ("POS terminals"), data pertaining to a merchandise item to be purchased is obtained by scanning a bar code on the merchandise item. The grocery industry, for example, has adopted uniform product codes which are printed as bar codes directly on the merchandise items or which are printed on labels which are placed on the merchandise items. A typical scanning system includes a stationary optical scanner located inside a housing of the scanning system with a glass window permanently mounted in the top surface of the housing. The glass window provides a transparent support through which scanning light beams from the optical scanner are projected and over which a purchased merchandise item and its associated label are passed for scanning.

In one aspect of the invention, there is provided a removable window carrier for mounting in a scanner checkout counter having a top surface; said removable window carrier comprising: a frame member having an aperture therein; a window member; and securing means located on the frame member and associated with the aperture for removably securing the window member in the aperture; whereby when the removable window carrier is mounted in the scanner checkout counter the window member provides a transparent support through which scanning light beams are projected and over which items of merchandise bearing coded labels are passed.

SUMMARY OF THE INVENTION

The present invention overcomes the problems in the prior art by providing a removable window carrier for carrying a window member.

In one aspect, this invention includes a removable window carrier for mounting in the top surface of a scanner checkout counter, the removable window carrier comprising: a frame member having an aperture therein, a window member, and securing means located on the frame member and associated with the aperture for removably securing the window member in the aperture, whereby when the removable window carrier is mounted in the top surface of the scanner checkout counter the window member provides a transparent support through which scanning light beams are projected and over which items of merchandise bearing coded labels are passed.

In another aspect of the invention there is provided a scanning apparatus for reading bar code labels on items of merchandise passing over the scanning apparatus, the scanning apparatus comprising: a housing including a checkout counter having a top surface for supporting the items of merchandise, the top surface having a first aperture therein, optical scanning means positioned in the housing for projecting scanning light beams through the first aperture, the scanning light beams being used for scanning bar code labels on the items of merchandise, and window carrier means removably disposed in the first aperture of said top surface, the top surface having a supporting means associated with the first aperture for supporting the window carrier means in the top surface, the window carrier means further comprising: a frame member having a second aperture therein, a window member, and securing means located on the frame member and associated with the second aperture for removably securing the window member in the second aperture, whereby when the removable window carrier is mounted in the top surface of the checkout counter the window member provides a transparent support through which scanning light beams are projected and over which items of merchandise bearing coded labels are passed.

An object of this invention is to provide a removable frame member which carries a window member.

Another object of this invention is to be able to remove the window member easily and quickly from the window carrier without the use of any tool.

Another object of this invention is to provide a window carrier having a window member which is easy to handle and to clean.

Another object of this invention is to provide a window carrier that is inexpensive to manufacture.

Another object of this invention is to provide a window carrier which makes it safer to handle the window.

Another object of this invention is to provide a removable window carrier which can easily be mounted in and removed from a scanner checkout counter.

With these and other objects, which will become apparent from the following description, the invention includes certain novel features of construction and combinations of parts, a preferred form or embodiment of which is hereinafter described with reference to the drawings which accompany and form a part of this specification.

BRIEF DESCRIPTION OF THE DRAWING

FIG. 3, is a perspective view of a scanner checkout system partly broken away to show a typical environment in which this invention might be used;

DETAILED DESCRIPTION OF THE INVENTION

Figure 1:
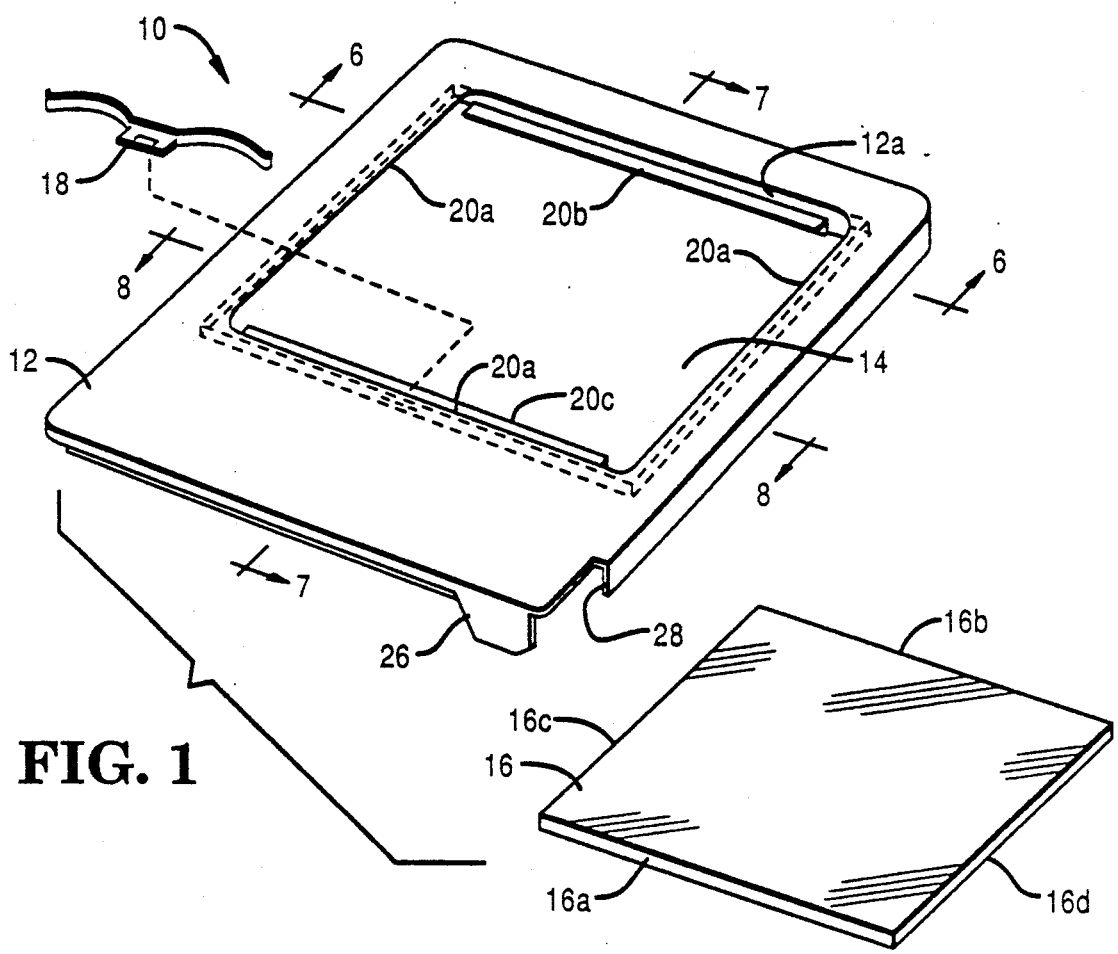
FIG. 1 is an exploded perspective view of a preferred embodiment of this invention, showing a frame member, a window member and a securing means.
Figure 5:
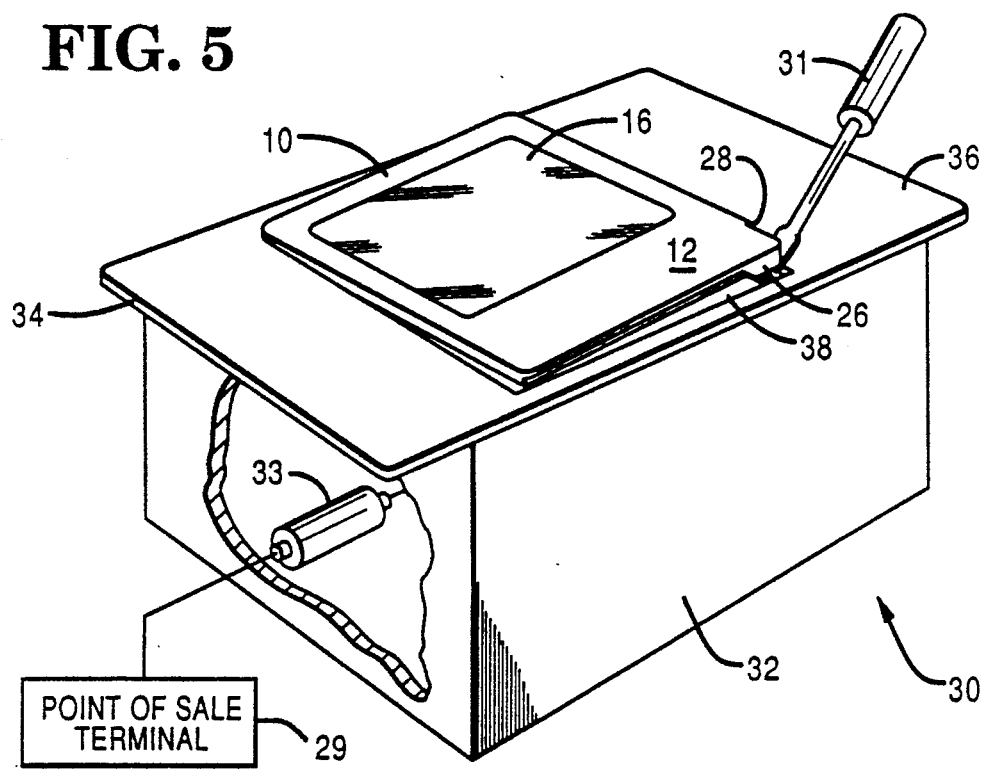
FIG. 5, on the sheet containing

FIG. 1 is an exploded perspective view showing a removable window carrier, designated generally as removable carrier 10. As best shown in FIG. 5 and as described later herein, carrier 10 is removably mounted in an opening 38 in a top surface 36 of a scanner checkout counter 34 to provide a transparent support through which light beams (not shown) are projected and over which items of merchandise (not shown) bearing coded labels are passed. Removable carrier 10 (FIG. 1) comprises a frame member 12 having an opening or aperture 14. In a preferred embodiment, frame member 12 is made of plastic and is generally rectangular. In the preferred embodiment, aperture 14 is also generally rectangular. The removable carrier 10 also includes a window member 16 which can be made from any transparent material, such as glass or thermoplastic.

The window member 16 includes edges 16a and 16b which engage spring member 18 and wall 12a, respectively, when the window member 16 is mounted in frame 12, as will be described later herein, and edges 16c and 16d which engage the remaining sides of the aperture 14.

Figure 7:
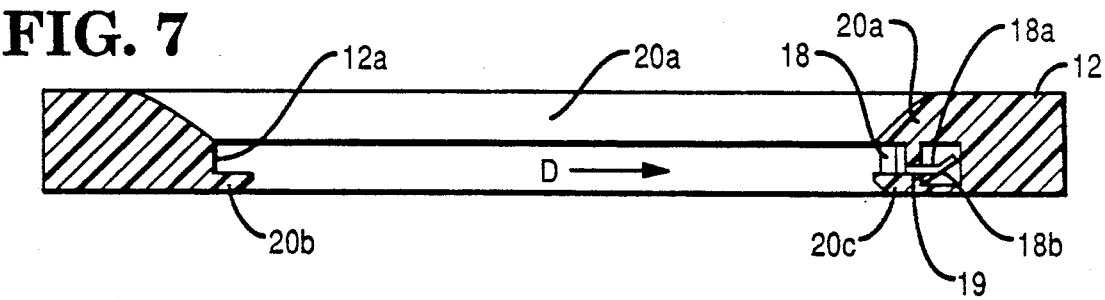
FIG. 7 is a cross-sectional view of the invention, taken along line 7—7 of FIG. 1, with a double U-shaped spring mounted in the frame.
Figure 8:
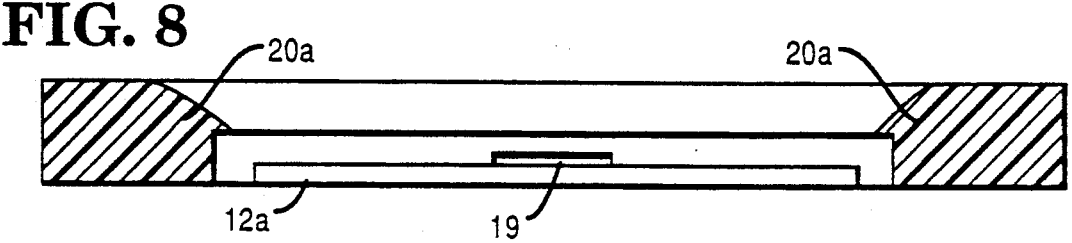
FIG. 8 is a cross-sectional view of the invention, taken along line 8—8 of FIG. 1, without the double U-shaped spring mounted in the frame.
Figure 9:
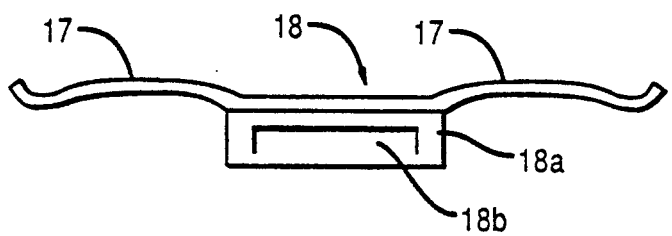
FIG. 9 is a top view of the double U-shaped spring element of the invention, showing a flange portion thereof.
Figure 10:
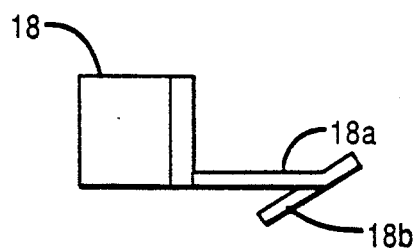
FIG. 10 is a side view of the double U-shaped spring, showing a one-way spring in the flange portion thereof.

The removable carrier 10 also includes the spring member 18 (FIGS. 1, 9, and 10) for securing window member 16 to frame member 12 in aperture 14. In the preferred embodiment of the invention, the securing means or spring member 18 includes two U-shaped springs 17, as best shown in FIG. 9. The spring member 18 also includes a flange 18a which cooperates with a complementary slot 19 (FIGS. 7 and 8) in frame 12 in order to secure spring member 18 to frame 12. It is to be noted that the flange 18a includes a resilient portion 18b (FIGS. 9 and 10) which forms a resilient spring which retains the spring member 18 in a mounted position in frame 12. As best shown in FIG. 7, the spring member 18 is mounted into frame 12 by moving spring member 18 in the direction of arrow D in FIG. 7 and forcing the flange 18a into the complementary slot 19.

Figure 3:
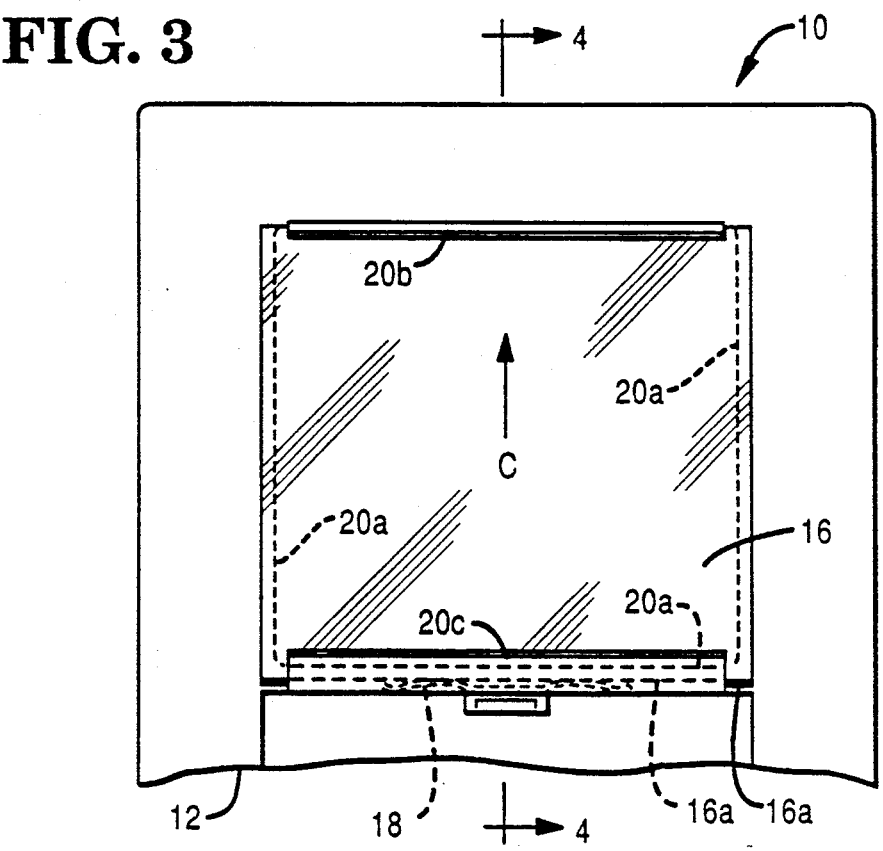
FIG. 3 is a bottom view of the invention, showing the supporting flanges which support the window member.
Figure 6:
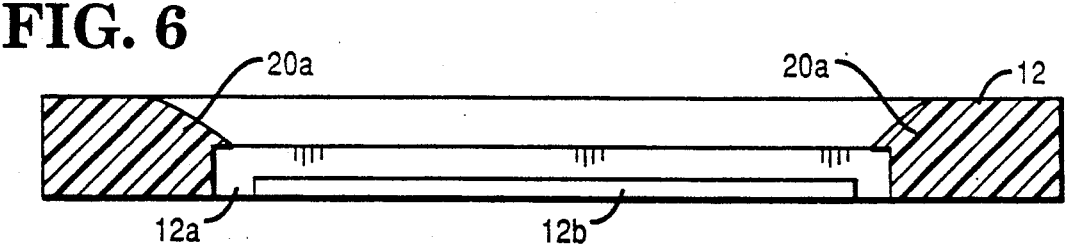
FIG. 6 is a cross-sectional view of the invention, taken along line 6—6 of FIG. 1.

As best shown in FIGS. 1 and 3, the top of frame member 12 includes a top flange 20a which is continuous around three sides of aperture 14. The frame member 12 also includes a first bottom flange 20b and a second bottom flange 20c. The first and second bottom flanges 20b and 20c cooperate with flange 20a to support and retain window member 16 in a mounted position in frame member 12, as described later herein. It is to be noted that the top flange 20a may be angled or beveled inwardly, as best shown in FIGS. 6, 7, and 8, to facilitate passing items of merchandise over the frame member 12.

The frame member 12 also includes guide means 26 (FIG. 2) for guiding removable carrier 10 into opening 38 of top surface 36 of scanner checkout counter 34 and also for restricting the movement of removable carrier 10 after removable carrier 10 is mounted in opening 38. The removable carrier 10 also includes a cutaway portion 28 in frame member 12 for facilitating the dismounting of removable carrier 10 from top surface 36 of scanner checkout counter 34. The cutaway portion or removing means 28 accommodates a tool 31 (FIG. 5) for lifting removable carrier 10 from top surface 36 of scanner checkout counter 34.

Figure 4:
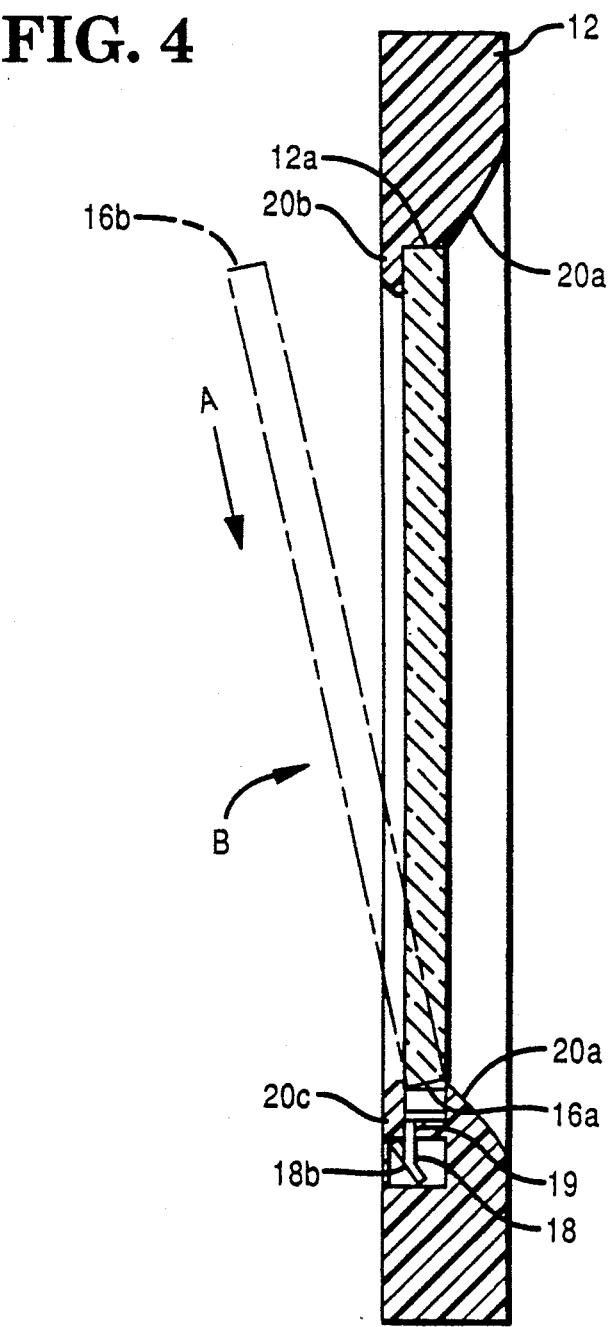
FIG. 4 is a cross-sectional view of the invention, taken along line 4—4 of FIG. 3.

The assembly and operation of removable carrier 10 will now be described. As best illustrated in FIG. 7, spring member 18 is mounted in frame member 12 in operative relationship with aperture 14 by moving spring member 18 in the direction of arrow D in FIG. 7 and forcing flange 18a into the complementary slot 19. When it is desirable to mount window member 16 in frame member 12, window member 16 is first positioned (FIG. 4) at the rear of frame member 12. The edge 16a of window member 16 is forced against the double U-shaped spring member 18 in the direction of arrow A in FIG. 4, thereby compressing spring member 18 and enabling the window edge 16b to "clear" the first bottom flange 20b when the window member 16 is moved in the direction of arrow B. After window member 16 clears first bottom flange 20b and edges 16a, 16c, and 16d are positioned against top flange 20a, the U-shaped spring member 18 then biases window member 12 in the direction of arrow C in FIG. 3, thereby forcing window edge 16b between the top flange 20a and first bottom flange 20b and against frame wall 2a (FIG. 4). It is to be noted that when window member 16 is mounted against top flange 20a and spring member 18 biases window edge 16b against frame wall 12a, top flange 20a cooperates with both the first and second bottom flanges 20b and 20c to retain the window member 16 in a mounted position in frame member 12. When it is desirable to dismount or remove window member 16 from frame member 12, window member 16 is forced in the direction opposite that of arrow C (FIG. 3), thereby compressing the springs 17 of spring member 18. While spring member 18 is compressed, window member 16 can clear the first bottom flange 20b when the window member 16 is moved in a direction opposite that of arrow B (FIG. 4), thereby enabling window member 16 to be dismounted or removed from frame member 12.

FIG. 5 shows a typical scanning system environment in which this invention might be used. The scanning system environment includes a scanning apparatus 30 having a housing 32 having the scanner checkout counter 34. The scanning system environment also includes a POS terminal 29 which is conventionally coupled to an optical scanner 33 located within the housing 32. The scanner checkout counter 34 has a top surface 36 for supporting items of merchandise, and the top surface 36 has an opening 38 in which the removable carrier 10 is mounted. Data pertaining to merchandise items to be purchased is obtained when a cashier or check-out employee passes a merchandise item (not shown) over window member 16 in the removable carrier 10 in order to scan a bar code on the merchandise item. It is to be noted that the removable carrier 10 has a shape that complements the shape of opening 38 so that removable carrier 10 can be mounted "flush" in top surface 36. In a preferred embodiment, the housing 32 and scanner checkout counter 34 are molded from plastic. Removable carrier 10 and top surface 36 are substantially flat and coplanar when removable carrier 10 is mounted in top surface 36 of scanner checkout counter 34. The scanner checkout counter 34 includes support flange 40 (FIG. 2) associated with and extending around the periphery of opening 38 for supporting removable carrier 10 when it is mounted in top surface 36. The support flange 40 has a slot 42 which has a shape which is complementary to the shape of guide means 26. The guide means 26 and slot 42 facilitate guiding and properly positioning removable carrier 10 in top surface 36.

Figure 2:
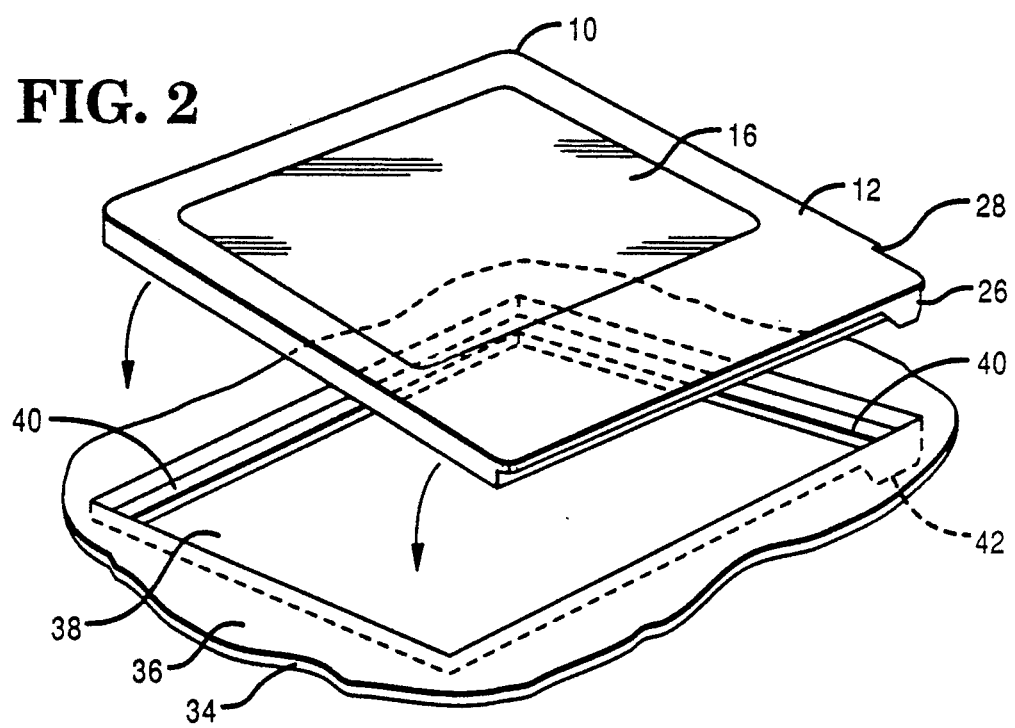
FIG. 2 is a fragmentary perspective view of this invention showing how the removable window carrier is mounted in a scanner checkout counter.

As best illustrated in FIG. 5, when removable carrier 10 is mounted in top surface 36, window member 16 provides a transparent support through which scanning light beams from optical scanner 33 are projected and over which items of merchandise (not shown) bearing coded labels are passed. When it is desirable to, for example, replace a scratched window member 16 or to clean both sides of window member 16, the tool 31 is inserted in removing means 28 and removable carrier 10 is lifted and dismounted from top surface 36. Window member 16 can then be handled by gripping frame member 12 of removable carrier 10. This makes it easy to replace or clean window member 16. When it is desirable to mount removable carrier 10 in opening 38 of top surface 36, removable carrier 10 is guided or positioned over opening 38 until removable carrier 10 is supported by support flange 40 (FIG. 2).

Various changes or modifications in the invention described may occur to those skilled in the art without departing from the spirit or scope of the invention. The above description of the invention is intended to be illustrative and not limiting, and it is not intended that the invention be restricted thereto but that it be limited only by the true spirit and scope of the appended claims.

What is claimed is:

1. A removable window carrier for mounting in a scanner checkout counter having a top surface;
    said removable window carrier comprising:
       a frame member having an aperture therein;
       a window member; and
       securing means located on said frame member and associated with said aperture for removably securing said window member in said aperture;
    whereby when said removable window carrier is mounted in the scanner checkout counter said window member provides a transparent support through which scanning light beams are projected and over which items of merchandise bearing coded labels are passed;
    said frame member including first and second walls which are generally opposed to third and fourth walls, respectively, to define said aperture; said securing means including a top flange located only on said first, second, and fourth walls and further including first and second bottom flanges which are located only on said first and third walls, respectively, whereby said top flange and said first and second bottom flanges cooperate to secure the window member in said aperture.

2. A removable window carrier for mounting in a scanner checkout counter having a top surface;
    said removable window carrier comprising:
       a frame member having an aperture therein;
       a window member; and
       securing means located on said frame member and associated with said aperture for removably securing said window member in said aperture;
    whereby when said removable window carrier is mounted in the scanner checkout counter said window member provides a transparent support through which scanning light beams are projected and over which items of merchandise bearing coded labels are passed;
    said securing means including a resilient member having a generally double U-shaped spring;
    said double U-shaped spring further including a flange having a resilient portion, said frame member further having a slot which complements said flange so that when said flange is inserted in said slot said resilient portion secures said double U-shaped spring to said frame member;
    said resilient portion comprising an angled spring extending out of the flange to retain said double U-shaped spring to said frame member.

3. A scanning apparatus for reading bar code labels on items of merchandise passing over the scanning apparatus, said scanning apparatus comprising:
    a housing including a checkout counter having a top surface for supporting the items of merchandise, said top surface having a first aperture therein;
    optical scanning means positioned in said housing for projecting scanning light beams, said scanning light beams being used for scanning bar code labels on the items of merchandise; and
    window carrier means removably disposed in said first aperture of said checkout counter;
    said checkout counter having a supporting means associated with said first aperture for supporting said window carrier means in said checkout counter;
    said window carrier means further comprising:
       a frame member having a second aperture therein;
       a window member; and
       securing means located on said frame member and associated with said second aperture for removably securing said window member in said second aperture;
    whereby when said removable window carrier is mounted in said checkout counter said window member provides a transparent support through which scanning light beams are projected and over which items of merchandise bearing coded labels are passed;
    said frame member including first and second walls which are generally opposed to third and fourth walls, respectively, to define said second aperture;
    said securing means including a top flange located only on said first, second, and fourth walls and further including first and second bottom flanges which are located only on said first and third walls, respectively, whereby said top flange and said first and second bottom flanges cooperate to secure said window member in said second aperture.

4. A scanning apparatus for reading bar code labels on items of merchandise passing over the scanning apparatus, said scanning apparatus comprising:
    a housing including a checkout counter having a top surface for supporting the items of merchandise, said top surface having a first aperture therein;
    optical scanning means positioned in said housing for projecting scanning light beams, said scanning light beams being used for scanning bar code labels on the items of merchandise; and
    window carrier means removably disposed in said first aperture of said checkout counter;
    said checkout counter having a supporting means associated with said first aperture for supporting said window carrier means in said checkout counter;
    said window carrier means further comprising:
       a frame member having a second aperture therein;
       a window member; and
       securing means located on said frame member and associated with said second aperture for removably securing said window member in said second aperture;
    whereby when said removable window carrier is mounted in said checkout counter said window member provides a transparent support through which scanning light beams are projected and over which items of merchandise bearing coded labels are passed;

said securing means comprising a generally double U-shaped spring;

said double U-shaped spring further including a flange having a resilient portion, said frame member further having a slot which complements said flange so that when said flange is inserted in said slot said resilient portion secures said double U-shaped spring to said frame member;

said resilient portion comprising an angled spring extending out of the flange to retain said double U-shaped spring to said frame member.

* * * * *

UNITED STATES PATENT AND TRADEMARK OFFICE
CERTIFICATE OF CORRECTION

PATENT NO. : 5,065,842
DATED : November 19, 1991
INVENTOR(S) : Rathindra Nahar It is certified that error appears in the above-identified patent and that said Letters Patent is hereby corrected as shown below:

Column 4, line 18, delete "2a" and substitute --12a--.

Signed and Sealed this

Fourth Day of May, 1993

Attest:

MICHAEL K. KIRK

*Attesting Officer*    Acting Commissioner of Patents and Trademarks